United States Patent [19]

Dawdy

[11] Patent Number: 4,467,071

[45] Date of Patent: Aug. 21, 1984

[54] EPOXY MODIFIED STRUCTURAL ADHESIVES HAVING IMPROVED HEAT RESISTANCE

[75] Inventor: Terrance H. Dawdy, Erie, Pa.

[73] Assignee: Lord Corporation, Erie, Pa.

[21] Appl. No.: 416,835

[22] Filed: Sep. 13, 1982

[51] Int. Cl.³ .................... C08L 63/00; C08L 75/00; C08F 8/00
[52] U.S. Cl. .................................. 525/112; 525/113; 525/108; 525/107; 525/118; 525/122; 525/121; 525/528; 525/529
[58] Field of Search ............... 525/112, 113, 122, 528, 525/438, 108, 107, 118, 121, 529

[56] References Cited

U.S. PATENT DOCUMENTS

| | | | |
|---|---|---|---|
| 3,524,901 | 8/1970 | Najvar et al. | 525/529 |
| 3,524,903 | 8/1970 | Hargis et al. | 525/529 |
| 3,860,673 | 1/1975 | Lawrence | 525/939 |
| 3,994,764 | 11/1976 | Wolinski | 525/440 |
| 4,126,504 | 11/1978 | Wolinski et al. | 525/112 |
| 4,223,115 | 9/1980 | Zalucha et al. | 525/126 |
| 4,259,472 | 3/1981 | Chattha | 525/528 |

Primary Examiner—Wilbert J. Briggs
Assistant Examiner—A. L. Carrillo
Attorney, Agent, or Firm—John A. Gazewood

[57] ABSTRACT

Structural adhesive systems having improved heat resistance comprising a solution or dispersion of a polymeric material in a monomer copolymerizable therewith, an unsaturated organophosphorus partial ester and an epoxy resin are disclosed.

16 Claims, No Drawings

4,467,071

EPOXY MODIFIED STRUCTURAL ADHESIVES HAVING IMPROVED HEAT RESISTANCE

FIELD OF THE INVENTION

The present invention relates to structural adhesive compositions. More particularly, the invention relates to improving heat resistance of structural adhesive compositions.

Structural adhesive compositions are well-known articles of commerce which are extensively used commercially for bonding metal and plastic materials. The load-bearing and stress-relieving properties of structural adhesives, as well as their bond strength, which can exceed the strength of the engineering materials which are being bonded, make these adhesives attractive alternatives to or replacements for mechanical methods, such as riveting or spot welding, of joining engineering materials, especially where it is preferable to distribute load stresses over larger areas rather than to concentrate such stresses at a few points. Their use can reduce or eliminate costly finishing operations necessitated by mechanical joining methods, present a more pleasing exterior and at least reduce the possibility of corrosion of assemblies containing one or more metal components. Additionally, they can be used to bond a diversity of metals without extensive surface preparation. For example, Zalucha et al U.S. Pat. No. 4,223,115 and Briggs et al U.S. Pat. No. 3,890,407 disclose acrylic structural adhesive compositions which are effective bonding materials for oily metal surfaces.

Despite the attractiveness of acrylic structural adhesives, they are not without deficiency. For example, a burgeoning application area for such adhesives is in the bonding of lightweight metal and plastic materials in the transportation industry in the fabrication of vehicle bodies and component parts. In such applications, the final assembly is typically painted after the adhesive has been cured, preferably at ambient conditions of temperature, and the painted surfaces are exposed to a bake cycle at temperatures above 100° C. to augment setting and adhesion of the paint film. While the acrylic adhesives provide excellent bond characteristics at ambient conditions of temperature, it has been found that assemblies bonded with such adhesives, when exposed to elevated temperature bake cycles, suffer a significant loss of adhesive strength when tested at temperatures corresponding to those employed in the bake cycle and suffer a reduction in initial adhesion values when tested at ambient temperature following exposure to such elevated temperatures. Quite obviously, improvements in elevated temperature performance, without otherwise detracting from adhesive performance, would significantly enhance the use of acrylic structural adhesives.

In accordance with the present invention, it has been discovered that the heat resistance, that is, the ability to resist thermal degradation as evidenced by the recovery of initial properties after exposure to elevated temperatures, of acrylic structural adhesives can be significantly improved by incorporating into such adhesives at least one epoxy resin and at least one olefinically unsaturated organic partial ester of a phosphorus acid. According to the invention, the amount of epoxy resin is greater than stoichiometric with respect to the acid hydroxyl function of the organophosphorus partial ester, that is, the epoxy resin is employed in an amount so as to provide more than one equivalent of epoxide functionality per equivalent of acid —OH moieties and no catalytic hardener for the epoxy resin is employed, in order to enhance epoxide phosphate ester formation without full reaction of all epoxide groups. Adhesive compositions prepared in accordance with the invention afford increased initial adhesion values, better recovery of initial properties following exposure to elevated temperatures (improved heat resistance) and increased hot strength, that is, adhesive strength at elevated temperatures, than are afforded by the same adhesives which do not contain both the epoxy resin and the organophosphorus partial ester.

In accordance with the present invention, acrylic structural adhesives having improved elevated temperature properties have been discovered. More particularly, the novel acrylic structural adhesive compositions of the invention comprise, in combination, A. at least one polymeric material selected from the group consisting of
 1. at least one olefinically unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
 2. at least one butadiene-based elastomeric polymeric material selected from the group consisting of
  (a) homopolymer of butadiene;
  (b) copolymer of butadiene and at least one monomer copolymerizable therewith selected from the group consisting of styrene, acrylonitrile, methacrylonitrile and mixtures thereof;
  (c) modified elastomeric polymeric material selected from the group consisting of butadiene homopolymer and copolymer as previously defined, such homopolymer and copolymer having been modified by copolymerization therein of trace amounts up to 5 percent by weight, based on weight of modified elastomeric polymeric material, of at least one functional monomer; and
  (d) mixtures thereof;
 3. at least one polymer-in-monomer syrup consisting essentially of
  (a) from 2 to 90 percent by weight of at least one polymerizable addition polymer;
  (b) from 10 to 98 percent by weight of at least one polymerizable olefinically unsaturated monomeric compound having at least one $$-\underset{|}{C}=\underset{|}{C}-\text{group; and}$$

(c) from 0 to 30 percent by weight of a polymer containing the group $(CH_2CCl=CHCH_2)_n$, wherein n is an integer;
  wherein (a) and (b) the present as a partial polymerization product of (b) or of (b) in the presence of (c); the mixture of (a) and (b) or of (a), (b) and (c) being a syrup of polymer dissolved or dispersed in unpolymerized monomer, in which syrup the amount of (a) derived from (b) is in the range from 2 to 90 percent by weight, based on the total weight of (a), (b) and (c).

4. at least one polymerizable polymeric material selected from the group consisting of polyvinyl alkyl ether, styrene-acrylonitrile resin, unsaturated polyester resin and mixtures thereof, the alkyl moiety of such ether containing from one to 8 carbon atoms;
5. at least one homopolymer or copolymer of at least one monomer selected from the group consisting of styrene and alkyl or hydroxyalkyl esters of acrylic or methacrylic acid, said ester having from one to 18 carbon atoms in the alkyl moiety; and
6. mixtures of such polymers;

B. at least one polymerizable material selected from the group consisting of styrene, acrylic or substituted acrylic monomer, and mixtures thereof, the amount of such polymerizable monomer being in addition to any such monomer present in (A)(3);

C. at least one phosphorus-containing compound having at least one olefinically unsaturated group and at least one P—OH group;

D. at least one epoxy resin; and

E. room temperature-active redox catalyst system.

More specifically, the room temperature-curable acrylic structural adhesive of the invention comprise:

1. at least one olefinicially unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;

2. at least one butadiene-based elastomeric polymeric material selected from the group consisting of
   (a) homopolymer of butadiene;
   (b) copolymer of butadiene and at least one monomer copolymerizable therewith selected from the group consisting of styrene, acrylonitrile, methacrylonitrile and mixtures thereof;
   (c) modified elastomeric polymeric material selected from the group consisting of butadiene homopolymer and copolymer as previously defined, such homopolymer and copolymer having been modified by copolymerization therein of trace amounts up to 5 percent by weight, based on weight of modified elastomeric polymeric material, of at least one functional monomer; and
   (d) mixtures thereof;

3. at least one polymer-in-monomer syrup consisting essentially of
   (a) from 2 to 90 percent by weight of at least one addition polymer;
   (b) from 10 to 98 percent by weight of at least one polymerizable olefinically unsaturated compound having at least one

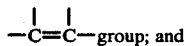

(c) from 0 to 30 percent by weight of a polymer containing the group $(CH_2CCl=CHCH_2)_n$, wherein n is an integer;
   wherein (a) and (b) are present as a partial polymerization product of (b) or of (b) in the presence of (c); the mixture of (a) and (b) or of (a), (b) and (c) being a syrup of polymer dissolved or dispersed in monomer, in which syrup the amount of (a) derived from (b) is in the range from 2 to 90 percent by weight, based on the total weight of (a), (b) and (c);

4. at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;

5. at least one homopolymer or copolymer of at least one monomer selected from the group consisting of styrene and alkyl or hydroxyalkyl esters of acrylic or methacrylic acid, said ester having from one to 18 carbon atoms in the alkyl moiety; and 6. mixtures of such polymers;

B. at least one polymerizable material selected from the group consisting of styrene, acrylic or substituted acrylic monomer, and mixtures thereof;

C. at least one phosphorus-containing compound having at least one olefinically unsaturated group and at least one P—OH group;

D. at least one epoxy resin;

E. at least one reducing agent of a room temperature-active redox couple catalyst system; and F. a bonding accelerator containing at least one oxidizing agent of a room temperature-active redox couple catalyst system, said oxidizing agent being reactive at room temperature with said reducing agent to produce free radicals effective to initiate polymerization of said addition-polymerizable polymeric material and said polymerizable olefinically unsaturated monomer, polymer of one or more such monomers or partially polymerized syrup of one or more such monomers, wherein the amount of such olefinically unsaturated urethane reaction product is in the range from 10 to 90, preferably 13 to 83, percent by weight, based on total weight of polymerizable materials and reducing agent; the amount of such butadiene-based elastomeric polymeric material is in the range from 1 to 30, preferably 7 to 27, percent by weight, based on total weight of polymerizable materials and reducing agent; the amount of such polymer-in-monomer syrup is in the range from 2 to 60, preferably 5 to 60, percent by weight, based on total weight of polymerizable materials and reducing agent; the amount of said polyvinyl alkyl ester, styrene-acrylonitrile resin and unsaturated polyester resin is in the range from 5 to 75, preferably 15 to 75, percent by weight, based on total weight of polymerizable materials and reducing agent; the amount of said homopolymer or copolymer of at least one of styrene and esters of acrylic or substituted acrylic acids is in the range from 2 to 60, preferably 5 to 60, percent by weight, based on total weight of polymerizable materials and reducing agent; the amount of such styrene and acrylic or substituted acrylic monomers is in the range from 10 to 90, preferably 17 to 87, percent by weight, based on total weight of polymerizable materials and reducing agent; the mount of said phosphorus-containing compound is in the range from 0.1 to 20, preferably 2 to 10, percent by weight, based on total weight of polymerizable materials and reducing agent; the epoxy resin is present in an amount sufficient to provide from 1 to 5, preferably 1.75 to 4.25, epoxide equivalents per equivalent of P—OH; said reducing agent is present in an amount of 0.05 to 10, preferably 0.1 to 6, percent by weight, based on total weight of polymerizable materials; and the amount of said oxidizing agent is in the range from 0.5 to 30, preferably 1 to 10, percent by weight, based on total weight of bonding accelerator. as used in the specification and claims, the term "P—OH" refers to acid equivalents of the olefinically unsaturated phosphorous-containing compound.

The adhesive systems of the invention can optionally contain up to 50, preferably not more than 25, percent by weight, based on total weight of polymerizable material and reducing agent, of at least one polymerizable olefinically unsaturated non-acrylic monomer; up to 60, preferably not more than 30, percent by weight, based on total weight of polymerizable material and reducing agent, of at least one polymerizable polymeric material having an intrinsic viscosity in the range from 0.1 to 1.3, such polymeric material being obtained from the polymerization of at least one styrene monomer, acrylic monomer, substituted acrylic monomer, olefinically-unsaturated non-acrylic monomer or mixtures thereof; up to 40, preferably not more than 30, percent by weight, based on total weight of polymerizable materials and reducing agent, of at least one addition-polymerizable elastomeric material having a second order glass transition temperature below 5° C.; up to 5 percent by weight of at least one unsaturated dicarboxylic acid ester; up to 10 percent by weight of at least one unsaturated polyester resin; up to 20 percent by weight of at least one unsaturated carboxylic acid having one or more, preferably one, carboxylic acid group; and up to 1 percent by weight of at least one waxy substance selected from the group consisting of paraffin wax, montan wax, beeswax, ceresin wax and spermaceti wax.

Polymer-in-monomer syrups suitable for use in the present invention, compositionally as well as their preparation, are well known in the art. Representative syrups, including precursor liquid monomer compounds containing at least one olefinically unsaturated group, and their preparation are disclosed in U.S. Pat. Nos. 3,333,025; 3,725,504; and 3,873,640. Briefly, such syrups are conveniently prepared by de-aerating the starting mixture consisting essentially of at least one polymerizable liquid olefinically unsaturated compound and, when used, polymer containing the group $(CH_2—CCl=CH—CH_2)_n$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed, the polymer-in-monomer syrup is cooled. Preferably, the syrups have a viscosity in the range from about 500 to about 1,000,000 mPa·s at 20° C.

Monomeric liquid olefinically unsaturated compounds suitable for use in the adhesive compositions of the invention for forming polymer-in-monomer syrups and as additional polymerizable materials are characterized by the presence of at least one

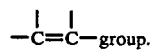

The olefinically unsaturated group is preferably a vinyl group, more preferably terminally located, with acrylic and substituted acrylic monomers being currently preferred. Representative olefinically unsaturated monomers include, without limitation, methyl methacrylate, butyl methacrylate, ethyl acrylate, diethylene glycol dimethacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butylstyrene.

Polymers containing the grouping $(CH_2—CCl=CH—CH_2)_n$, wherein n is in integer, are well-known in the art under the name neoprene, which is produced by the polymerization of 2-chloro-1,3-butadiene. Further elucidation would be superfluous.

The isocyanate-functional prepolymers which are suitable for use in the practice of this invention are well known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least two free, unreacted isocyanate groups.

Polyols useful in preparing isocyanate-functional prepolymer used in the present invention preferably have an average molecular weight of about 300 to about 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadiene-styrene) polyols and poly(butadiene) polyols; polyester polyols such as are prepared by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as epsilon caprolactone.

Polyisocyanates which can be reacted with polyols to form isocyanate-functional prepolymers for use in the present invention can be any monomeric; that is, non-polymeric, isocyanate compound having at least two free isocyanate groups, including aliphatic, cycloaliphatic and aromatic compounds. Representative polyisocyanates include, without limitation thereto, 2,4-tolylene diisocyanate, 2,6-tolylene diisocyanate, 4,4'-diphenylmethane diisocyanate, m- and p-phenylene diisocyanate, polymethylene poly(phenyl isocyanate), hexamethylene diisocyanate, 4,4'-methylene-bis(cyclohexyl isocyanate), isophorone diisocyanate, and other aliphatic cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate-functional prepolymer include, without limitation, hydroxyethyl acrylate, hydroxyethyl methacrylate, allyl alcohol, and vinyl alcohol.

The butadiene-based elastomeric polymeric materials which are suitable for use in the practice of this invention are also well known and can be any elastomer derived from 1,3-butadiene or its halogenated analogs which has a glass transition temperature below ambient temperature and preferably not above about 5° C. Suitable elastomers include butadiene homopolymer, copolymers of butadiene with styrene, acrylonitrile and methacrylonitrile, and such homopolymers and copolymers modified by copolymerization therein of trace amounts (0.05 to 5%) of a functional comonomer, such as acrylic acid, methacrylic acid, maleic anhydride, fumaric acid, styrene and methyl methacrylate.

Polyvinyl alkyl ethers suitable for use in the adhesive compositions which are described herein are well-known in the art. Such ethers will preferably contain 1 to 8, more preferably 1 to 4, carbon atoms in the alkyl moiety of said ether. Likewise, styrene-acrylonitrile polymers which are suitable for use in the invention are well known.

Elastomeric polymeric materials having second order glass transition temperatures below about 5° C. can be effective in modifying room temperature flexibility of the adhesive bond. Especially preferred of such elastomers are polychloroprene rubber; polybutadiene rubber; butadiene copolymer rubbers such as acrylonitrile-butadiene, carboxylated acrylonitrile-butadiene and styrene-butadiene rubbers; polyacrylate rubbers such as poly(ethyl acrylate) and poly-(ethyl acrylate-halogenated vinyl ether-acrylic acid) rubbers; and ethylene copolymers such as ethylene-vinyl acetate rubbers. Other elastomeric polymers having a glass transition temperature about 5° C. can be employed since, other than the low glass transition temperature, there are no other limitations on the identity of the elastomer except for the specific requirements of the particular adhesive being formulated, such as suitable molecular weight, viscosity characteristics and compatibility with the other ingredients of the adhesives.

Such elastomeric polymeric materials are particularly beneficial when incorporated in acrylic adhesives comprising at least one olefinically unsaturated polyurethane.

Non-acrylic monomers which can be employed in the hereindecribed adhesive systems include styrene, chlorostyrene, vinyl styrene and vinyl acetate.

Polymeric materials having an intrinsic viscosity of 0.1 to about 1.3 which are suitable for use in the present invention can be obtained by the polymerization of one or more acrylic and nonacrylic monomers, including mixtures thereof. Exemplary polymeric materials include poly(methyl methacrylate/n-butylacrylate/ethyl acrylate) (90/5/5%); poly(n-butyl methacrylate/isobutyl methacrylate) (50/50%); poly(n-butyl methacrylate) and poly(ethyl methacrylate). Preferably, the viscosity will be about midway in the recited range.

The use of polymeric materials having such intrinsic viscosities is especially beneficial in acrylic adhesives containing homopolymers and copolymers of 1,3-butadiene.

The epoxy compounds which are suitable for use in the invention can be any monomeric or polymeric compound or mixture of compounds having 1,2-epoxy equivalency greater than one, that is, wherein the average number of 1,2-epoxy groups per molecule is greater than 1; with polymeric epoxide compounds having a molecular weight in the range from 400 to 10,000 being currently preferred. Epoxy compounds are well known, see, for example, U.S. Pat. Nos. 2,467,171; 2,615,007; 2,716,123; 3,030,336 and 3,053,855. Useful epoxy compounds include the polyglycidyl ethers of polyhydric alcohols, such as ethylene glycol, triethylene glycol, 1,2-propylene glycol, 1,5-pentanediol, 1,2,6-hexanetriol, glycerol and 2,2-bis(4-hydroxy-cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linolenic acid; and the polyglycidyl ethers of polyphenols, such as Bisphenol A, 1,1-bis(A-hydroxy-phenyl)ethane, 1,1-bis(hydroxy-phenyl) isobutane, 2,2-bis(4-hydroxy-t-butyl-phenyl) propane, 1,5-dihydroxynaphthalene and novolak resins; with cycloaliphatic polyglycidyl compounds being currently preferred.

Phosphorus-containing compounds which are suitable for use in the adhesive compositions of the invention are selected from the group consisting of derivatives of phosphinic acid, phosphonic acid and phosphoric acid having at least one —POH group and at least one organic moiety characterized by the presence of at least one olefinically unsaturated group, which is preferably terminally located. More particularly, such olefinically unsaturated organophosphorus compounds have the characteristic formula

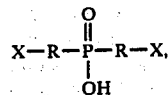

I.

wherein each R is the same or different, and each R is independently a divalent organic radical directly bonded to the phosphorus atom through a carbon-phosphorus bond, said divalent radical being selected from the group consisting of divalent unsubstituted organic radical and divalent organic radical having at least one substituent group selected from the class consisting of halogen, hydroxyl, amino, alkyl radical containing from 1 to 8, preferably 1 to 4, carbon atoms and aryl radical having at least one moiety containing at least one aromatic nucleus; at least one X is $CH_2=<$ and the other X is a functional group selected from the group consisting of hydrogen, hydroxyl, amino, mercapto, halogen and $CH_2=C<$;

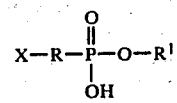

II.

wherein R is as previously defined; $R^1$ is hydrogen or $—R^2—X$, wherein $R^2$ is a divalent organic radical directly bonded to the oxygen radical through a carbon-oxygen bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein X is as previously defined, with the proviso that at least one X moiety must be $CH_2=C<$;

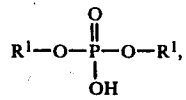

III.

wherein $R^1$ is as previously described, with the proviso that at least one $R^1$ group contains at least one $CH_2=C<$ moiety.

A currently preferred group of phosphorus-containing compound has the formula

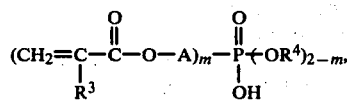

IV.

wherein $R^3$ is selected from the group consisting of hydrogen, halogen, an alkyl group having from one to 8, preferably one to 4, carbon atoms, and $CH_2=CH-$; $R^4$ is selected from the group consisting of hydrogen, an alkyl group having from one to 8, preferably one to 4 carbon atoms, and a haloalkyl group having one to 8, preferably one to 4 carbon atoms; A is selected from the group consisting of $-R^5O-$ and $(R^6O)_n$, wherein $R^5$ is an aliphatic or cycloaliphatic alkylene group containing from one to 9, preferably 2 to 6, carbon atoms; $R^6$ is an alkylene group having from one to 7, preferably 2 to 4, carbon atoms; n is an integer from 2 to 10, and m is one or 2, preferably one.

In the several formulae I-IV, the divalent organic radicals R and $R^2$ can have a compound structure, that is, the radical can contain at least one, or a series of at least two, unsubstituted or substituted hydrocarbon group(s) containing or separated from each other by $-O-$, $-S-$, $-COO-$, $-NH-$, $-NHCOO-$, and $(R^7O)_p$, wherein $R^7$ is an alkylene group containing from 2 to 7, preferably 2 to 4 carbon atoms, and p is an integer from 2 to 10. Preferably, the divalent radical is an alkylene radical having a straight chain or ring of from one to 22, preferably one to 9, carbon atoms in any non-repeating unit. It will be understood that divalent radicals having a compound structure would have two or more of such straight chains or rings. The divalent radicals can be saturated or unsaturated; aliphatic, cycloaliphatic or aromatic; and, with compound structures, can include mixtures thereof; and generally have from 1 to about 22 carbon atoms in each chain or ring of carbon atoms.

In the several formulae I-III, representative X—R— and X—$R^2$ radicals include, without limitation thereto, lower alkenyl, cyclohexenyl, hydroxy-lower alkenyl, halo-lower alkenyl, carboxy-lower alkenyl, lower alkyl, amino-lower alkyl, hydroxy-lower alkyl, mercapto-lower alkyl, alkoxy-lower alkyl, halo-lower alkyl, diphosphonomethylamino-lower alkyl, phenyl-hydroxyphosphonomethyl, aminophenyl-hydroxyphosphonomethyl, halophenyl-hydroxy-phosphonomethyl, phenyl-aminophosphonomethyl, halophenyl-aminophosphonomethyl, hydroxy-phosphonomethyl, lower alkyl-hydroxy-phosphonomethyl, halo-lower alkylhydroxy-phos-phonomethyl and amino-lower alkyl-hydroxy-phosphonomethyl; the term "lower" referring to a group containing from 1 to 8, preferably 1 to 4 carbon atoms.

Phosphorous-containing compounds having vinyl unsaturation are preferred over such compounds having allylic unsaturation, with monoethers of phosphinic, phosphonic and phosphoric acids having one unit of vinyl or allylic, especially vinyl, unsaturation presently being preferred. Representative phosphorus-containing compounds include, without limitation, phosphoric acid; 2-methacryloyl oxyethyl phosphate; bis-(2-methacryloyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of Formula IV wherein $R^3$ is hydrogen or methyl and $R^4$ is propyl, isobutyl, ethylhexyl, halopropyl, haloisobutyl or haloethylhexyl; vinyl phosphonic acid; cyclohexene-3-phosphonic acid; alphahydroxybutene-2-phosphonic acid; 1-hydroxy-1-phenylmethane-1,1-diphosphonic acid; 1-hydroxy-1-methyl-1-1-diphosphonic acid; 1-amino-1-phenyl-1,1-diphosphonic acid; 3-amino-1-hydroxypropane-1,1-diphosphonic acid; amino-tris(methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; bis(β-methacryloyloxyethyl) phosphinic acid and allyl methacryloyloxyethyl phosphinic acid.

Regardless of whether incorporated into the polymerizable adhesive composition or bonding activator, infra, the phosphorus-containing compound will be present in an amount in the range from about 0.1 to about 20, preferably about 2 to about 10 weight percent, based on total weight of polymerizable adhesive composition, including reducing agent.

The bonding activators which are employed in the adhesive systems of this invention consist essentially of (1) from about 0.5 to about 30, preferably about 1 to about 10 weight percent, based on total weight of bonding activator, of at least one oxidizing agent which can function as an oxidant of a redox couple catalyst system; and (2) from about 70 to about 99.5 weight percent, based on total weight of bonding accelerator, of carrier vehicle. In addition, the bonding accelerator also contains either the epoxy resin or the unsaturated organophosphorus compound, infra.

The room temperature-reactive redox couple catalyst systems which are employed in the adhesive systems of this invention are well-known and need not be discussed herein in detail. Basically, such systems comprise at least one oxidizing agent and at least one reducing agent which are co-reactive at room temperature to generate free radicals effective in the present invention, to initiate addition polymerization reactions. Substantially any of the known oxidizing and reducing agents which are so co-reactive can be employed in the practice of the present invention. Representative oxidizing agents include, without limitation, organic peroxides such as benzoyl peroxide and other diacyl peroxides, hydroperoxides such as cumene hydroperoxide, peresters such as t-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolylsulfonmethyl) amine, bis-(tolylsulfonmethyl) ethyl amine and bis(tolylsulfonmethyl)-benzyl amine; tertiary amines such as diisopropyl-p-toluidine, dimethyl aniline and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 30, preferably about one to about 10, percent by weight of bonding accelerator, with the amount of reducing agent being in the range from about 0.05 to about 10, preferably about 0.1 to about 6, percent by weight of polymerizable adhesive composition.

The carrier vehicles which are suitable for use in the bonding activators of the present invention can be a simple inert solvent or diluent such as methylene chloride, or butyl benzyl phthalate, including mixtures of such solvents or diluents. The carrier vehicle should contain not more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the accelerator composition. A particularly preferred carrier vehicle comprising at least one film-forming binder is an admixture comprising about 0.05 to about 50 percent by weight of, (1), at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials which can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals, and polycarbonates. The carrier vehicle can contain, in addition to solvent or solvent and film-forming binder, additives such as external plasticizers, flexibilizers, suspenders, and stabilizers, providing that any such additives do not unacceptably adversely affect the stability of the activator compositions.

Because the addition of phosphorus-containing compounds to polymerizable acrylic adhesive compositions can have a retarding effect which is directly proportional to the amount of such compounds, the addition of from 0.01 to 10, preferably 0.5 to 5, percent by weight of polymerizable materials of tertiary amines having the formula

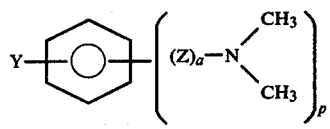

V.

wherein Z is methylene; Y is selected from the group consisting of hydrogen, hydroxy, amino, halogen, alkyl of 1 to 8, preferably 1 to 4, carbon atoms, and alkoxy having from 1 to 8, preferably 1 to 4, carbon atoms; a is zero, or 1; and b is 1 or 2 is advantageous in accelerating the cure of such compositions containing the unsaturated organophosphorus compounds. Especially preferred of such tertiary amines are N,N-dimethyl aniline and N,N-dimethylaminomethylphenol. It is significant to note that tertiary amines which do not have the formula V are not effective as cure accelerators for polymerizable acrylic adhesive compositions containing unsaturated organophosphorus compounds having the formulae I–IV.

It has further been found that the environmental resistance of the herein-described adhesive systems can be improved by the addition of from about 0.005 to about 15, preferably about 0.1 to about 10, percent by weight, based on total weight of polymerizable adhesive composition of a mixture of a metal molybdate selected from the group consisting of zinc molybdate, calcium molybdate, barium molybdate, strontium molybdate and mixtures thereof, and a metal phosphate selected from the group consisting of zinc phosphate, calcium phosphate, magnesium phosphate and mixtures thereof, said metal molybdate being present on a volume concentration basis of from about 2 to about 3 parts per part of said metal phosphate. Such mixtures, including their preparation, are more fully described in U.S. Pat. No. 4,017,315, the disclosure of which is incorporated herein by reference.

It has also been discovered that polybasic lead salts of phosphorus acid and saturated and unsaturated organic dicarboxylic acids and acid anhydrides, particularly dibasic lead phthalate, monohydrous tribasic lead maleate, tetrabasic lead fumarate, dibasic lead phosphite and mixtures thereof; and zinc oxide, in an amount in the range from about 0.1 to about 15, prefereably about 1 to about 10, percent by weight, based on total weight of polymerizable adhesive composition, are effective in improving environmental resistance.

Other additives conventionally employed in adhesive compositions, such as fillers, pigments and the like can be added to the herein-described adhesive systems.

The base adhesive compositions and bonding accelerators are prepared by conventional methods, such as are disclosed, for example, in U.S. Pat. Nos. 3,832,274 and 3,890,407.

The adhesive systems of the present invention are provided as multipack adhesive systems where one part contains the polymerizable adhesive composition and a second part contains the bonding accelerator, with the two parts being mixed at the time of use. It is necessary that the epoxy compound be kept separate from compounds having acidic moieties, such as the unsaturated organophosphorus compound and methacrylic acid to inhibit premature reaction between these components. Thus, prior to using the compositions, one pack will contain the unsaturated organophosphorus partial ester and the other pack will contain the epoxy resin. Preferably, the epoxy resin will be incorporated into the bonding accelerator which contains the oxidant of the redox couple catalyst system, with the organophosphorus compound being incorporated into the pack containing the polymerizable adhesive composition. While other multipack systems are available, e.g., the bonding accelerator can contain the reductant of the redox couple catalyst system and the epoxy resin with the oxidant and polymerization inhibitors being incorporated into the pack containing the polymerizable adhesive mass, they are less preferable with respect to shelf stability. After mixing the individual parts, one or both surfaces to be joined are coated with the mixed adhesive system and the surfaces are placed in contact with each other. The adhesive systems of the invention may be used to bond metal surfaces, such as steel, aluminum and copper, to a variety of substrates, including metal, plastics, and other polymers, reinforced plastics, fibers, glass, ceramics, wood and the like.

It is a particular feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

The invention is illustrated by the following examples, wherein all parts, proportions and percentages are by weight unless otherwise indicated.

EXAMPLE I

An adhesive resin, hereinafter identified as AR-I, was prepared by reacting 1.0 mole of polycaprolactone triol having an average molecular weight of 54.0, 0.65 mole of polycaprolactone diol having an average molecular weight of 2000 and 4.3 moles of toluene diisocyanate in the presence of a catalytic amount of dibutyltin dilaurate and methyl methacrylate diluent until all hydroxy groups had been reacted, yielding isocyanate-functional urethane prepolymer dissolved in methyl methacrylate diluent. To the reaction was added 4.3 moles of hydroxyethyl acrylate and the reaction continued until all isocyanate moieties had been reacted, yielding acrylated polyurethane resin AR-I at 65% resin solids in methyl methacrylate (MMA) monomer diluent.

EXAMPLE II

Adhesive systems were prepared in a conventional manner having the following compositions (amounts are in parts by weight):

| Adhesive Composition | II-A | II-B |
|---|---|---|
| AR-I (Ex. I, 65% AR-I in MMA) | 20.6 | 23.8 |
| Carboxylated poly(1,3-butadiene/acrylonitrile) elastomer | 38.3 | 45.6 |
| Methylmethacrylate | 5.7 | 7.4 |
| Methacrylic acid | 0.0 | 7.6 |
| Diisopropyl-p-toluidine | 1.0 | 1.3 |
| Dimethylaniline | 1.6 | 1.8 |
| Milled glass fibers | 15.3 | 0.0 |
| Calcium carbonate (3 vol.)/zinc phosphate (1 vol.) | 3.7 | 4.3 |
| Silica | 3.8 | 5.0 |
| Paraffin wax | 0.3 | 0.0 |
| 2-Methacryloyloxyethyl phosphate (70% in MMA) | 5.2 | 4.2 |
| Benzoyl peroxide (40% in dibutyl phthalate) | 4.0 | 4.0 |
| Bisphenol A epoxy resin | Variable[a] | 0[a] |

[a] = the amount of epoxy resin varied from 0 PBW to 40.5 PBW to provide II-A adhesive systems having equivalent of epoxy/equivalent of POH values - of 0, 1, 2, 3, 4 and 6. The equivalent of epoxy/equivalent of POH value for adhesive system II-B is zero.

After blending the ingredients to obtain homogeneous compositions, the adhesive systems were used for steel-steel (annealed 1010 cold-rolled steel) metal bonding. The fully-mixed adhesives were coated onto one mating surface and a second uncoated mating surface was pressed onto the adhesive to complete the test assemblies. The total glueline thickness was approximately 20 mils for each test assembly. The test pieces were cured at room temperature for 12 hours. Following the cure cycle, one-third of the test assemblies were subjected to a two-step postbake heat treatment (30 min.@138° C./30 min.@204° C.) and cooled to room temperature; and one-third of the test assemblies were conditioned for 30 minutes@204° C. and not cooled. Lap shear tests were performed at room temperature and at 204° C. on the cured assemblies according to the procedure of ASTM D-1002-72. The test results, in pounds/in² (psi), are reported in Table II.

TABLE II

| Adhesive | Equiv. Epoxy/ Equiv. POH | Lap Shear Strength (psi) | | |
|---|---|---|---|---|
| | | RT[b] | PB/RT[c] | 204° C.[d] |
| II-A | 0 | 1140 | 1565 | 66 |
| II-A | 1 | 1281 | 2090 | 150 |
| II-A | 2 | 1330 | 2410 | 248 |
| II-A | 3 | 1360 | 2210 | 205 |
| II-A | 4 | 1410 | 2030 | 173 |
| II-A | 6 | 1450 | 1610 | 48 |
| II-B | 0 | 2760 | 1340 | 16 |

[b] = test pieces, after cure cycle, evaluated at room temperature.
[c] = test pieces, after cure cycle, subjected to postbake cycle (30 min. @ 138° C./30 min. @ 204° C.), cooled to room temperature, and evaluated at room temperature.
[d] = test pieces, after cure cycle, conditioned 30 min. @ 204° C. and evaluated at 204° C.

The data clearly demonstrate the improvement on heat resistance and high temperature performance when the adhesive systems contain both epoxy resin and unsaturated organophosphorus partial ester and demonstrate also the effect of epoxy content (epoxy:POH ratio) on adhesive performance.

EXAMPLE III

Adhesive systems were prepared in a conventional manner by blending the following ingredients (amounts are in parts by weight):

| Adhesive | III-A | III-B | III-C |
|---|---|---|---|
| AR-I (Ex. I, 65% in MMA) | 20.6 | 20.6 | — |
| Carboxylated poly(1,3-butadiene/acrylonitrile) rubber | 38.3 | 38.3 | — |
| Methylmethacrylate | 5.7 | 5.7 | — |
| Trimethylolpropane trimethacrylate | 4.6 | 4.6 | — |
| Diisopropyl-p-toluidine | 1.0 | 1.0 | — |
| Dimethylaniline | 1.6 | 1.6 | — |
| Milled glass fibers | 15.3 | 15.3 | — |
| Calcium carbonate (3 vol.)/zinc phosphate (1 vol.) | 3.7 | 3.7 | — |
| Silica | 3.8 | 3.8 | — |
| Paraffin wax | 0.3 | 0.3 | — |
| 2-Methacryloyloxyethyl phosphate (70% in methyl- | 5.2 | 5.2 | 3.6 |

-continued

| Adhesive | III-A | III-B | III-C |
|---|---|---|---|
| methacrylate) | | | |
| Benzoyl peroxide (40% in dibutyl phthalate) | 4.0 | 4.0 | — |
| Bisphenol A epoxy resin, equiv. wt. 185 | 0.0 | 25.8 | 25.8 |
| Equivalents, epoxy | 0.0 | 0.13 | 0.13 |
| P-OH | 0.034 | 0.034 | 0.034 |

The thus-prepared adhesive systems were used to bond annealed 1010 cold-rolled steel elements following the procedure of Example II, including preparation of test samples, adhesive cure cycle, heat treatment (if any) and testing of adhesive bond. The test results, in psi, are reported in Table III.

TABLE III

| Adhesive | Lap Shear Strength, psi | | |
|---|---|---|---|
| | RT | PB/RT | 204° C. |
| III-C | 445 | 1120 | <10 |
| III-A | 1140 | 1565 | 66 |
| III-B | 1410 | 2030 | 173 |

The data, which compare the performance of epoxy, epoxy/acrylic and acrylic adhesive systems containing unsaturated organophosphorus partial esters, are self-explanatory.

EXAMPLE IV

Adhesive systems were prepared in a conventional manner having the following compositions (amounts are in parts by weight):

| Adhesive | IV-A | IV-B | IV-C | IV-D | IV-E | IV-F | IV-G |
|---|---|---|---|---|---|---|---|
| AR-I (Ex. I, 65% in MMA) | 20.6 | 20.6 | 20.6 | 20.6 | 20.6 | 20.6 | 20.6 |
| Carboxylated poly(butadiene/acrylonitrile) elastomer | 38.3 | 38.3 | 38.3 | 38.3 | 38.3 | 38.3 | 38.3 |
| Methylmethacrylate | 5.7 | 5.7 | 5.7 | 5.7 | 5.7 | 5.7 | 5.7 |
| Trimethylolpropane trimethacrylate | 4.6 | 4.6 | 4.6 | 4.6 | 4.6 | 4.6 | 4.6 |
| Diisopropyl-p-toluidine | 1.0 | 1.0 | 1.0 | 1.0 | 1.0 | 1.0 | 1.0 |
| Dimethylaniline | 1.6 | 1.6 | 1.6 | 1.6 | 1.6 | 1.6 | 1.6 |
| Milled glass fibers | 15.3 | 15.3 | 15.3 | 15.3 | 15.3 | 15.3 | 15.3 |
| Calcium carbonate (3 vol.)/zinc phosphate (1 vol.) | 3.7 | 3.7 | 3.7 | 3.7 | 3.7 | 3.7 | 3.7 |
| Silica | 3.8 | 3.8 | 3.8 | 3.8 | 3.8 | 3.8 | 3.8 |
| Paraffin wax | 0.3 | 0.3 | 0.3 | 0.3 | 0.3 | 0.3 | 0.3 |
| 2-Methacryloyloxyethyl phosphate (70% in MMA) | 5.2 | 5.2 | 5.2 | 5.2 | 5.2 | 5.2 | 5.2 |
| Benzoyl peroxide (40% in dibutyl phthalate) | 4.0 | 4.0 | 4.0 | 4.0 | 4.0 | 4.0 | 4.0 |
| Bisphenol A epoxy resin | 25.8 | 25.8 | 25.8 | 25.8 | 25.8 | 25.8 | 25.8 |
| 2-Methacryloyloxyethyl phosphate (70% in MMA) | 0.0 | 1.0 | 2.0 | 0.0 | 0.0 | 0.0 | 0.0 |
| Phosphoric acid | 0.0 | 0.0 | 0.0 | 1.0 | 2.0 | 0.0 | 0.0 |
| 2-Hydroxyethyl methacrylate | 0.0 | 0.0 | 0.0 | 0.0 | 0.0 | 10.0 | 0.0 |
| Methacrylic acid | 0.0 | 0.0 | 0.0 | 0.0 | 0.0 | 0.0 | 3.0 |

The thus-prepared adhesives were mixed, applied, cured and tested following the procedure of Examples II and III, except that the metal was nonannealed 1010 cold-rolled steel. The data are reported in Table IV.

TABLE IV

| Adhesive | Lap Shear Strength, psi | | |
|---|---|---|---|
| | RT | PB/RT | 204° C. |
| IV-A | 3140 | 4546 | 164 |
| IV-B | 3606 | 4760 | 140 |
| IV-C | 3500 | 4626 | 114 |
| IV-D | 3370 | 3680 | 90 |
| IV-E | 3280 | 3200 | 28 |
| IV-F | 4480 | 4772 | 124 |
| IV-G | 4100 | 4540 | 284 |

The data are self-explanatory.

EXAMPLE V

Adhesive compositions were prepared in a conventional manner by blending the following ingredients (amounts are in parts by weight):

| Adhesive | V-A | V-8 |
|---|---|---|
| AR-I (Ex. I, 65% AR-I in MMA) | 20.6 | 23.8 |
| Carboxylated poly(1,3-butadiene/acrylonitrile) elastomer | 38.3 | 45.6 |
| Methylmethacrylate | 5.7 | 7.4 |
| Methacrylic acid | 0.0 | 7.6 |
| Diisopropyl-p-toluidine | 1.0 | 1.3 |
| Dimethylaniline | 1.6 | 1.8 |
| Milled glass fibers | 15.3 | 0.0 |
| Calcium carbonate (3 vol.)/zinc phosphate (1 vol.) | 3.7 | 4.3 |
| Silica | 3.8 | 5.0 |
| Paraffin wax | 0.3 | 0.0 |
| 2-Methacryloyloxyethyl phosphate (70% in MMA) | 5.2 | 4.2 |
| Benzoyl peroxide (40% in dibutyl phthalate) | 4.5 | 4.0 |
| Bisphenol A epoxy resin, equiv. wt. 450 | 6.1 | 0.0 |
| Bisphenol A epoxy resin, equiv. wt. 190 | 24.4 | 0.0 |
| Calcium carbonate | 24.5 | 0.0 |
| Silica | 0.6 | 0.0 |

The thus-prepared adhesives were used to bond nonannealed cold-rolled steel metal assemblies, following the application and cure procedures of Example II. Following the cure cycle, the bonded metal assemblies were conditioned at 204° C. at variable times and tested at 204° C. following the procedure of ASTM D-1002-72. The test results are reported in Table V.

TABLE V

| Exposure Time at 204° C., Hrs. | Lap Shear Strength (psi) Adhesive V-A | Adhesive V-B | |
|---|---|---|---|
| 0[a] | 4530 | 5940 | |
| 2 | 3700 | 1820 | D & G[b] |
| 4 | 3380 | 1480 | D & G[b] |
| 8 | 3920 | 1740 | D & G[b] |
| 16 | 4880 | 540 | D & G[b] |
| 24 | 4460 | 780 | D & G[b] |
| 72 | 4360 | 980 | D & G[b] |

[a] = Initial test values made at room temperature.
[b] = Adhesive discolored and gassed.

The data are self-explanatory.

EXAMPLE VI

Adhesive V-A from Example 5 was used to bond the following metal assemblies: annealed cold-rolled steel; 6061 T6 aluminum; 302 stainless steel; and G-90 galvanized annealed cold-rolled steel. The test assemblies were prepared and cured according to the procedures of Example II. Following the cure cycle, the test assemblies were postbaked as follows:

(a) heat 10 min.@163° C. and cool to room temperature;
(b) heat 23 min.@121° C. and cool to room temperature;
(c) heat 45 min.@163° C. and cool to room temperature;
(d) heat 45 min.@135° C. and cool to room temperature;
(e) heat 30 min.@121° C. and cool to room temperature;
(f) heat 40 min.@121° C. and cool to room temperature; and
(g) heat 45 min.@163° C. and cool to room temperature.

Following the postbake cycle, lap shear tests were performed following the procedure of ASTM D-1002-72 at various temperatures. The results are reported in Table VI.

TABLE VI

| Substrate | Lap Shear Strength, psi | | | |
|---|---|---|---|---|
| | −29° C. | RT | 85° C. | 204° C. |
| Annealed cold-rolled steel | 933 (CM) | 3240 (CM) | 2293 (CM) | 271 (C) |
| 6061 T6 aluminum | 917 (CM) | 3440 (CM) | 2654 (C) | 234 (C) |
| 302 stainless steel | 1550 (CM) | 4293 (CM) | 2280 (C) | 244 (C) |
| G-90 galvanized steel | 1207 (CM) | 3160 (CM) | 2827 (C) | 263 (C) |

TABLE VI-continued

| Substrate | Lap Shear Strength, psi | | | |
|---|---|---|---|---|
| | −29° C. | RT | 85° C. | 204° C. |

CM = indicates failure at adhesive-metal interface.
C = indicates cohesive failure of the adhesive.

The data demonstrate the utility of the adhesives of this invention on a variety of metal substrates.

EXAMPLE VII

The following two-part primer composition was prepared, amounts are in parts by weight.

| Ingredient | Part A | Part B |
|---|---|---|
| Polymethylene poly(phenyl isocyanate) | 16.0 | — |
| Hexakismethoxymelamine amino resin | — | 1.0 |
| Dibutyltin dilaurate | — | 0.15 |
| Methylene chloride | 84.0 | 98.85 |

The individual parts A and B of the primer composition were mixed and applied to polyester-based fiberglass reinforced plastic stock. The plastic stock was coated with an 0.1 mil wet film thickness of primer, which was allowed to dry for 30 minutes at ambient conditions of temperature and humidity. The primed plastic stock was bonded to, (1), annealed 1010 cold-rolled steel; (2), G-90 galvanized annealed cold-rolled steel; and, (3), identical plastic stock which had been identically primed; substrates which were coated with a 20 mil thickness of adhesive V-A from Example V. All test assemblies were cured following the procedure of Example II. Subsequent to the cure cycle, the test assemblies were subjected to the postbake cycle of Example VI and tested according to the procedure of that Example. The results are reported in Table VII.

TABLE VII

| Substrate | Lap Shear Strength, psi | | | |
|---|---|---|---|---|
| | −29° C. | RT | 85° C. | 204° C. |
| Plastic/plastic | 646/FT | 730/FT | 893/FT | 56/66 FT[a] |
| Plastic/1010 steel | 660/CM | 1060/40FT[a] | 950/FT | 48/33 FT[a] |
| Plastic/galvanized | 853/CM | 930/FT | 810/FT | 22 P |

FT = 100% fiber-tearing bond, failure of substrate.
CM = 100% failure at adhesive-metal interface.
P = 100% failure at primer-plastic interface.
[a] = percent fiber-tearing bond, balance of failure is primer-plastic interface.

The data demonstrate the utility of adhesive compositions prepared in accordance with the invention to bond plastic as well as metal materials.

EXAMPLE VIII

Adhesive compositions were prepared by blending the following ingredients (amounts are parts by weight)

| Adhesive | VIII-A | VIII-B | VIII-C | VIII-D |
|---|---|---|---|---|
| Carboxylated poly(1,3-butadiene/acrylonitrile) elastomer, (25% in methyl methacrylate) | 40.0 | 40.0 | 40.0 | 40.0 |
| Styrene/1,3-butadiene elastomer, (30% in methyl methacrylate) | 40.0 | 40.0 | 40.0 | 40.0 |
| 2-Methacryloyloxyethyl phosphate (70% in methyl methacrylate) | 6.3 | 6.3 | 6.3 | 6.3 |

-continued

| Adhesive | VIII-A | VIII-B | VIII-C | VIII-D |
|---|---|---|---|---|
| Methacrylic acid | 3.0 | 3.0 | 3.0 | 3.0 |
| Methyl methacrylate | 4.0 | 3.5 | 3.0 | 2.5 |
| Trimethylolpropane trimethacrylate | 0.0 | 0.5 | 1.0 | 1.5 |
| Diisopropyl-p-toluidine | 1.3 | 1.3 | 1.3 | 1.3 |
| Dimethylaniline | 1.5 | 1.5 | 1.5 | 1.5 |
| Paraffin wax | 0.3 | 0.3 | 0.3 | 0.3 |
| Silica | 2.4 | 2.4 | 2.4 | 2.4 |
| Benzoyl peroxide (40% in dibutyl phthalate) | 4.5 | 4.5 | 4.5 | 4.5 |
| Cycloaliphatic epoxy resin | 30.0 | 30.0 | 30.0 | 30.0 |
| Calcium carbonate | 24.0 | 24.0 | 24.0 | 24.0 |
| Silica | 1.5 | 1.5 | 1.5 | 1.5 |

The thus-prepared adhesives (it should be noted that the ingredients did not blend readily) were used to bond annealed cold-rolled steel. The test assemblies were prepared and cured according to the procedures of Example II. Subsequent to the cure cycle, the test assemblies were postbaked for 30 minutes at 94° C. and 30 minutes at 204° C. Lap shear tests were performed at 204° C. following the procedure of ASTM D-1002-72. The results are reported in Table VIII.

TABLE VIII
Adhesive Performance at Elevated Temperature

| Adhesive | Lap Shear Strength, psi 204° C. |
|---|---|
| VIII-A | 12 |
| VIII-B | 95 |
| VIII-C | 186 |
| VIII-D | 283 |

The data show effect of crosslinking on adhesive performance.

EXAMPLE IX

Adhesive compositions were prepared by blending the following ingredients (amounts are in parts by weight):

| Adhesive | IX-A | IX-B | IX-C | IX-D | IX-E | IX-F |
|---|---|---|---|---|---|---|
| Carboxylated poly(1,3-butadiene/acrylonitrile) elastomer (25% in methyl methacrylate) | 35.0 | 35.0 | 35.0 | 35.0 | 30.0 | 30.0 |
| Styrene/1,3-butadiene elastomer (30% in methyl methacrylate) | 25.0 | 25.0 | 30.0 | 30.0 | 30.0 | 30.0 |
| 2-Methacryloyloxyethyl phosphate (70% in methyl methacrylate) | 6.3 | 6.3 | 6.3 | 6.3 | 6.3 | 6.3 |
| Methacrylic acid | 3.0 | 3.0 | 3.0 | 3.0 | 3.0 | 3.0 |
| Methyl methacrylate | 23.5 | 23.5 | 18.5 | 18.5 | 23.5 | 23.5 |
| Trimethylolpropane trimethacrylate | 0.5 | 0.5 | 0.5 | 0.5 | 0.5 | 0.5 |
| Diisopropyl-p-toluidine | 1.3 | 1.3 | 1.3 | 1.3 | 1.3 | 1.3 |
| Dimethylaniline | 1.5 | 1.5 | 1.5 | 1.5 | 1.5 | 1.5 |
| Paraffin wax | 0.3 | 0.3 | 0.3 | 0.3 | 0.3 | 0.3 |
| Silica | 2.4 | 2.4 | 2.4 | 2.4 | 2.4 | 2.4 |
| Cycloaliphatic epoxy resin | 50.0 | 40.0 | 50.0 | 40.0 | 50.0 | 40.0 |
| CBTN-modified bisphenol A epoxy resin[a] | 0.0 | 10.0 | 0.0 | 10.0 | 0.0 | 10.0 |
| Calcium carbonate | 24.0 | 24.0 | 24.0 | 24.0 | 24.0 | 24.0 |
| Silica | 1.5 | 1.5 | 1.5 | 1.5 | 1.5 | 1.5 |
| Benzoyl peroxide (40% in dibutyl phthalate) | 4.5 | 4.5 | 4.5 | 4.5 | 4.5 | 4.5 |

[a] = carboxyl-terminated poly(1,3-butadiene/acrylonitrile) elastomer-modified bisphenol A epoxy resin.

The thus-prepared adhesives (it should be noted that the ingredients did not blend readily) were used to bond annealed cold-rolled steel. The test assemblies were prepared and cured according to the procedures of Example II. Subsequent to the cure cycle, the test assemblies were postbaked for 30 minutes at 94° C. and 30 minutes at 204° C. Lap shear tests were performed at 204° C. following the procedure of ASTM D-1002-72. The results are reported in Table IX.

TABLE IX

| Adhesive | Lap Shear Strength, psi 204° C. |
|---|---|
| IX-A | 172 |
| IX-B | 159 |
| IX-C | 167 |
| IX-D | 144 |
| IX-E | 221 |
| IX-F | 192 |

The data are self-explanatory.

EXAMPLE X

Adhesive compositions were prepared by blending the following ingredients (amounts are in parts by weight):

| Adhesive | X-A | X-B | X-C | X-D | X-E |
|---|---|---|---|---|---|
| Carboxylated poly(1,3-butadiene/acrylonitrile) elastomer (25% in MMA) | 35.0 | 35.0 | 35.0 | 35.0 | 35.0 |

-continued

| Adhesive | X-A | X-B | X-C | X-D | X-E |
|---|---|---|---|---|---|
| Styrene/1,3-butadiene elastomer (30% in MMA) | 30.0 | 30.0 | 30.0 | 30.0 | 30.0 |
| 2-Methacryloyloxyethyl phosphate (70% in MMA) | 6.3 | 6.3 | 6.3 | 6.3 | 6.3 |
| Methacrylic acid | 3.0 | 3.0 | 3.0 | 3.0 | 3.0 |
| Methyl methacrylate | 18.5 | 18.5 | 18.5 | 18.5 | 18.5 |
| Trimethylolpropane trimethacrylate | 0.5 | 0.5 | 0.5 | 0.5 | 0.5 |
| Diisopropyl-p-toluidine | 1.3 | 1.3 | 1.3 | 1.3 | 1.3 |
| Dimethylaniline | 1.5 | 1.5 | 1.5 | 1.5 | 1.5 |
| Paraffin wax | 0.3 | 0.3 | 0.3 | 0.3 | 0.3 |
| Silica | 2.4 | 2.4 | 2.4 | 2.4 | 2.4 |
| Benzoyl peroxide (40% in dibutyl phthalate) | 2.4 | 2.4 | 2.4 | 2.4 | 2.4 |
| Cycloaliphatic epoxy resin | 60.0 | 57.75 | 47.5 | 41.25 | 33.0 |
| CBTN-modified bisphenol A epoxy resin[a] | 6.0 | 0.0 | 0.0 | 0.0 | 0.0 |
| CBT-modified cycloaliphatic resin[b] | 0.0 | 8.25 | 16.5 | 24.75 | 33.0 |
| Calcium carbonate | 7.1 | 7.1 | 7.1 | 7.1 | 7.1 |
| Silica | 0.8 | 0.8 | 0.8 | 0.8 | 0.8 |

[a] = carboxyl-terminated poly(1,3-butadiene/acrylonitrile) elastomer-modified bisphenol A epoxy resin.
[b] = carboxyl-terminated poly(1,3-butadiene) elastomer-modified cyclocarboxylic epoxy resin.

The thus-prepared adhesives (it should be noted that the ingredients did not blend readily) were used to bond annealed cold-rolled steel. The test assemblies were prepared and cured according to the procedures of Example II. Subsequent to the cure cycle, the test assemblies were postbaked following the procedure of Example VI. Impact test were made at −29° C. following the General Motors Torsion Impact Test procedures. The results are reported in Table X.

TABLE X

| Adhesive | Impact Strength, in-lbs −29° C. |
|---|---|
| X-A | 39.4 |
| X-B | 44.7 |
| X-C | 48.6 |
| X-D | 76.6 |
| X-E | 55.3 |

The data demonstrate the effect of employing elastomer-modified epoxy resins on low temperature adhesive properties.

What is claimed is:

1. An adhesive composition comprising
   A. at least one polymeric material selected from the group consisting of:
   (1) at least one olefinically unsaturated urethane reaction product of at least one isocyanate-functional prepolymer and at least one hydroxy-functional monomer having at least one unit of polymerizable olefinic unsaturation, said reaction product being characterized by the presence of at least two units of olefinic unsaturation and the substantial absence of free isocyanate groups;
   (2) at least one butadiene-based elastomeric polymeric material selected from the group consisting of
      (a) homopolymer of butadiene;
      (b) copolymer of butadiene and at least one monomer copolymerizable therewith selected from the group consisting of styrene, acrylonitrile, methacrylonitrile and mixtures thereof;
      (c) modified elastomeric material selected from the group consisting of butadiene homopolymer and copolymer as previously described, such homopolymer and copolymer having been modified by copolymerization therein of trace amounts up to 5 percent by weight, based on weight of modified elastomeric material, of at least one functional monomer; and
      (d) mixtures thereof;
   (3) at least one polymer-in-monomer syrup consisting essentially of
      (a) from 2 to 90 percent by weight of at least one polymerizable addition polymer;
      (b) from 10 to 98 percent by weight of at least one polymerizable olefinically unsaturated monomeric compound having at least one

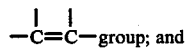
—C=C—group; and (c) from 0 to 30 percent by weight of a polymer containing the group $(CH_2CCl\!=\!CHCH_2)_n$, wherein n is an integer;
      wherein (a) and (b) are present as a partial polymerization product of (b) or of (b) in the presence of (c); the mixture of (a) and (b), or of (a), (b) and (c), being a syrup of polymer dissolved or dispersed in unpolymerized monomer, in which syrup the amount of (a) derived from (b) is in the range from 2 to 90 percent by weight, based on the total weight of (a), (b) and (c);
   (4) at least one polymeric material selected from the group consisting of polyvinyl alkyl ether, styreneacrylonitrile resin, unsaturated polyester resin and mixtures thereof, the alkyl moiety of said polyvinyl alkyl ether containing from one to 8 carbon atoms;
   (5) at least one polymeric material selected from the group consisting of homopolymers of styrene, homopolymers of alkyl or hydroxyalkyl esters of acrylic and methacrylic acid, and copolymers of at least two different monomers selected from the group consisting of styrene and alkyl or hydroxyalkyl esters of acrylic or methacrylic acid, said esters of acrylic or methacrylic acid having from one to 18 carbon atoms in the alkyl moiety; and
   (6) mixtures of such polymers;

B. at least one polymerizable material selected from the group consisting of styrene, acrylic or substituted acrylic monomer and mixtures thereof, the amount of such polymerizable monomer being in addition to any such monomer present in (A)(3);
C. at least one phosphorous-containing compound having at least one olefinically unsaturated group and at least one P—OH group;
D. at least one epoxy resin; and
E. room temperature-active redox couple catalyst system;
wherein said epoxy resin is present in an amount of one to 5 epoxide equivalents per equivalent of P—OH group.

2. An adhesive composition according to claim 1 containing up to 10 percent by weight, based on total weight of said adhesive composition of at least one tertiary amine having the formula

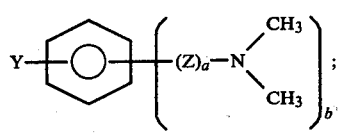

wherein Z is methylene, Y is selected from the group consisting of hydrogen, hydroxy, amino, halogen, alkyl radical haing from 1 to 8 carbon atoms, and alkoxy radical wherein the alkyl moiety has from 1 to 8 carbon atoms; a is zero or 1; and b is 1 or 2.

3. An adhesive composition according to claim 2 wherein said phosphorus-containing compound has the formula

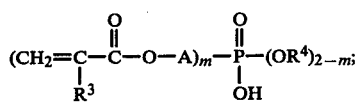

wherein $R^3$ is selected from the group consisting of hydrogen, halogen, an alkyl group having from 1 to 8 carbon atoms, and $CH_2\!=\!CH\!-\!$; $R^4$ is selected from the group consisting of hydrogen, an alkyl group having from 1 to 8 carbon atoms, and a haloalkyl group having from 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms, $R^6$ is an alkylene group having from 1 to 7 carbon atoms, n is an integer from 2 to 10, and m is 1 or 2.

4. An adhesive composition according to claim 1 wherein said polymeric material (A) is selected from the group consisting of
(1) at least one butadiene-based elastomeric polymeric material selected from the group consisting of
(a) homopolymer of butadiene;
(b) copolymer of butadiene and at least one monomer copolymerizable therewith selected from the group consisting of styrene, acrylonitrile, methacrylonitrile and mixtures thereof;
(c) modified elastomeric material selected from the group consisting of butadiene homopolymer and copolymer as previously described, such homopolymer and copolymer having been modified by copolymerization therein of trace amounts up to 5 percent by weight, based on weight of modified elastomeric material, of at least one functional monomer; and
(d) mixtures thereof; and
(2) an admixture of
(i) at least one olefinically unsaturated urethane reaction product of at least one isocyanate-functional prepolymer and at least one hydroxy-functional monomer having at least one unit of polymerizable olefinic unsaturation, said reaction product being characterized by the presence of at least two units of olefinic unsaturation and the substantial absence of free isocyanate groups; and
(ii) at least one butadiene-based elastomeric polymeric material selected from the group consisting of
(a) hompolymer of butadiene;
(b) copolymer of butadiene and at least one monomer copolymerizable therewith selected from the group consisting of styrene, acrylonitrile, methacrylonitrile and mixtures thereof;
(c) modified elastomeric material selected from the group consisting of butadiene hompolymer and copolymer as previously described, such homopolymer and copolymer having been modified by copolymerization therein of trace amounts up to 5 percent by weight, based on weight of modified elastomeric material, of at least one functional monomer; and
(d) mixtures thereof.

5. An adhesive composition according to claim 4 containing up to 10 percent by weight, based on total weight of said adhesive composition of at least one tertiary amine having the formula

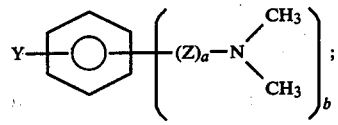

wherein Z is methylene, Y is selected from the group consisting of hydrogen, hydroxy, amino, halogen, alkyl radical having from 1 to 8 carbon atoms, and alkoxy radical wherein the alkyl moiety has from 1 to 8 carbon atoms; a is zero or 1; and b is 1 or 2.

6. An adhesive composition according to claim 5 wherein said phosphorus-containing compound has the formula

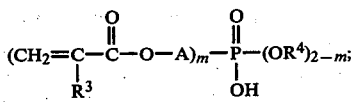

wherein $R^3$ is selected from the group consisting of hydrogen, halogen, an alkyl group having from 1 to 8 carbon atoms, and $CH_2\!=\!CH\!-\!$; $R^4$ is selected from the group consisting of hydrogen, an alkyl group having from 1 to 8 carbon atoms; and a haloalkyl group having from 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms, $R^6$ is an alylene group having from 1 to 7 carbon atoms, n is an integer from 2 to 10, and m is 1 or 2.

7. A room temperature polymerizable adhesive composition comprising
I. as a polymerizable adhesive composition, a mixture comprising
A. at least one polymeric material selected from the group consisting of
1. at least one olefinically unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
2. at least one butadiene-based elastomeric polymeric material selected from the group consisting of
(a) homopolymer of butadiene;
(b) copolymer of butadiene and at least one monomer copolymerizable therewith selected from the group consisting of styrene, acrylonitrile, methacrylonitrile and mixtures thereof;
(c) modified elastomeric polymeric material selected from the group consisting of butadiene homopolymer and copolymer as previously defined, such homopolymer and copolymer having been modified by copolymerization therein of trace amounts up to 5 percent by weight, based on weight of modified elastomeric polymeric material, of at least one functional monomer; and
(d) mixtures thereof;
3. at least one polymer-in-monomer syrup consisting essentially of
(a) from 2 to 90 percent by weight of at least one polymerizable addition polymer;
(b) from 10 to 98 percent by weight of at least one polymerizable olefinically unsaturated monomeric compound having at least one

(c) from 0 to 30 percent by weight of a polymer containing the group $(CH_2CCl=CHCH_2)_n$, wherein n is an integer
wherein (a) and (b) are present as a partial polymerization product of (b) or of (b) in the presence of (c); the mixture of (a) and (b) or of (a), (b) and (c) being a syrup of polymer dissolved or dispersed in monomer, in which syrup the amount of (a) derived from (b) is in the range from 2 to 90 percent by weight, based on the total weight of (a), (b) and (c);
4. at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;
5. at least one polymeric material selected from the group consisting of homopolymers of styrene, homopolymers of alkyl or hydroxyalkyl esters of acrylic and methacrylic acid, and copolymers of at least two different monomers selected from the group consisting of styrene and alkyl or hydroxyalkyl esters of acrylic or methacrylic acid, said esters of acrylic or methacrylic acid having from one to 18 carbon atoms in the alkyl moiety; and
6. mixtures of such polymers;
B. at least one polymerizable monomeric material selected from the group consisting of styrene, acrylic or substituted acrylic monomer, and mixtures thereof, the amount of such monomer being in addition to the amount of any such monomer in (A)(3);
C. at least one phosphorus-containing compound having at least one olefinically unsaturated group and at least one P—OH group;
D. at least one reducing agent of a room temperature-active redox couple catalyst system; and
II. a bonding accelerator comprising an admixture of at least one epoxy resin and at least one oxidizing agent of a room temperature-active redox couple catalyst system, said oxidizing agent being reactive in combination with the reducing agent of said catalyst system to produce free radicals effective to initiate polymerization of said polymerizable adhesive composition;
wherein the amount of such olefinically unsaturated urethane reaction product is in the range from 10 to 90 percent by weight, based on total weight of polymeric material A and polymerizable materials B and reducing agent; the amount of such butadiene-based elastomeric polymeric material is in the range from 1 to 30 percent by weight, based on total weight of polymeric material A and polymerizable materials B and reducing agent; the amount of such polymer-in-monomer syrup is in the range from 2 to 60 percent by weight, based on total weight of polymeric material A and polymerizable materials B and reducing agent; the amount of said polyvinyl alkyl ether, styrene-acrylonitrile resin and unsaturated polyester resin is in the range from 5 to 75 percent by weight, based on total weight of polymeric material A and polymerizable materials B and reducing agent; the amount of said homopolymer or copolymer of at least one of styrene and esters of acrylic or substituted acrylic acids is in the range from 2 to 60 percent by weight, based on total weight of polymeric material A and polymerizable materials B and reducing agent; the amount of such styrene and acrylic or substituted acrylic monomers is in the range from 10 to 90 percent by weight, based on total weight of polymeric material A and polymerizable materials B and reducing agent; the amount of said phosphorus-containing compound is in the range from 0.1 to 20 percent by weight, based on total weight of polymeric material A and polymerizable materials B and reducing agent; the epoxy resin is present in an amount of 1 to 5 epoxide equivalents per equivalent of P—OH; said reducing agent is present in an amount of 0.05 to 10 percent by weight, based on total weight of polymeric material A and polymerizable materials B; and the amount of said oxidizing agent is in the range from 0.5 to 30 percent by weight, based on total weight of bonding accelerator.

8. An adhesive composition according to claim 7 wherein said polymerizable adhesive composition I contains up to 10 percent by weight, based on total weight of I and II, of at least one tertiary amine having the formula

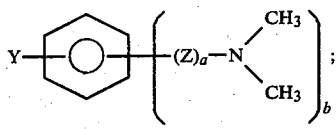

wherein Z is methylene, Y is selected from the group consisting of hydrogen, hydroxy, amino, halogen, alkyl radical having from 1 to 8 carbon atoms, and alkoxy radical wherein the alkyl moiety has from 1 to 8 carbon atoms; a is zero or 1; and b is 1 or 2.

9. An adhesive composition according to claim 8 wherein said phosphorus-containing compound has the formula

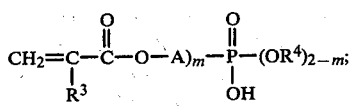

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having from 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms, $R^6$ is an alkylene group having from 1 to 7 carbon atoms, n is an integer from 2 to 10, and m is 1 or 2.

10. An adhesive composition according to claim 7 wherein said polymeric material I.A is selected from the group consisting of
   (1) at least one butadiene-based elastomeric polymeric material selected from the group consisting of
      (a) homopolymer of butadiene;
      (b) copolymer of butadiene and at least one monomer copolymerizable therewith selected from the group consisting of styrene, acrylonitrile, methacrylonitrile and mixtures thereof;
      (c) modified elastomeric material selected from the group consisting of butadiene homopolymer and copolymer as previously described, such homopolymer and copolymer having been modified by copolymerization therein of trace amounts up to 5 percent by weight, based on weight of modified elastomeric material, of at least one functional monomer; and
      (d) mixtures thereof; and
   (2) an admixture of
      (i) at least one olefinically unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups; and
      (ii) at least one butadiene-based elastomeric polymeric material selected from the group consisting of
         (a) homopolymer of butadiene;
         (b) copolymer of butadiene and at least one monomer copolymerizable therewith selected from the group consisting of styrene, acrylonitrile, methacrylonitrile and mixtures thereof;
         (c) modified elastomeric polymeric material selected from the group consisting of butadiene homopolymer and copolymer as previously defined, such homopolymer and copolymer having been modified by copolymerization therein of trace amounts up to 5 percent by weight, based on weight of modified elastomeric polymeric material, of at least one functional monomer; and
         (d) mixtures thereof.

11. An adhesive composition according to claim 10 wherein said polymerizable composition I contains up to 10 percent by weight, based on total weight of I and II of at least one tertiary amine having the formula

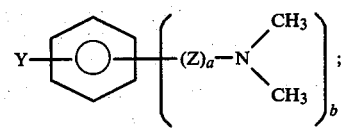

wherein Z is methylene, Y is selected from the group consisting of hydrogen, hydroxy, amino, halogen, alkyl radical having from 1 to 8 carbon atoms, and alkoxy radical wherein the alkyl moiety has from 1 to 8 carbon atoms; a is zero or 1; and b is 1 or 2.

12. An adhesive composition according to claim 11 wherein said phosphorus-containing compound has the formula

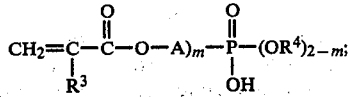

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having from 1 to 8 carbon atoms; A is selected from the group consisting of $-R^5O-$ and $(R^6O)_n$, wherein $R^5$ is an aliphatic or cycloaliphatic alkylene group containig from 1 to 9 carbon atoms, $R^6$ is an alkylene group having from 1 to 7 carbon atoms, n is an integer from 2 to 10, and m is 1 or 2.

13. A room temperature-curable adhesive system comprising
   I. as a polymerizable adhesive composition, a mixture comprising
      A. at least one polymeric material selected from the group consisting of
         1. at least one olefinically unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
         2. at least one butadiene-based elastomeric polymeric material selected from the group consisting of
            (a) homopolymer of butadiene;

(b) copolymer of butadiene and at least one monomer copolymerizable therewith selected from the group consisting of styrene, acrylonitrile, methacrylonitrile and mixtures thereof;

(c) modified elastomeric polymeric material selected from the group consisting of butadiene homopolymer and copolymer as previously defined, such homopolymer and copolymer having been modified by copolymerization therein of trace amounts up to 5 percent by weight, based on weight of modified elastomeric polymeric material, of at least one functional monomer; and (d) mixtures thereof;

3. at least one polymer-in-monomer syrup consisting essentially of (a) from 2 to 90 percent by weight of at least one polymerizable addition polymer;

(b) from 10 to 98 percent by weight of at least one polymerizable olefinically unsaturated monomeric compound having at least one $$-\overset{|}{C}=\overset{|}{C}-\text{group; and}$$

(c) from 0 to 30 percent by weight of a polymer containing the group $(CH_2CCl=CHCH_2)_n$, wherein n is an integer wherein (a) and (b) are present as a partial polymerization product of (b) or of (b) in the presence of (c); the mixture of (a) and (b) or of (a), (b) and (c) being a syrup of polymer dissolved or dispersed in monomer, in which syrup the amount of (a) derived from (b) is in the range from 2 to 90 percent by weight, based on the total weight of (a), (b) and (c);

4. at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;

5. at least one polymeric material selected from the group consisting of homopolymers of styrene, homopolymers of alkyl or hydroxyalkyl esters of acrylic and methacrylic acid, and copolymers of at least two different monomers selected form the group consisting of styrene and alkyl or hydroxyalkyl esters of acrylic or methacrylic acid, said esters of acrylic or methacrylic acid having from one to 18 carbon atoms in the alkyl moiety; and 6. mixtures of such polymers;

B. at least one polymerizable monomeric material selected from the group consisting of styrene, acrylic or substituted acrylic monomer, and mixtures thereof, the amount of such monomer being in addition to the amount of any such monomer in (A)(3);

C. at least one epoxy compound;

D. at least one reducing agent of a room temperature-active redox couple catalyst system; and II. a bonding accelerator comprising an admixture of at least one phosphorus-containing compound having at least one olefinically unsaturated group and at least one P—OH group and at least one oxidizing agent of a room temperature-active redox couple catalyst system, said oxidizing agent being reactive in combination with the reducing agent of said catalyst system to produce free radicals effective to initiate polymerization of said polymerizable adhesive composition;

wherein the amount of such olefinically unsaturated urethane reaction product is in the range from 10 to 90 percent by weight, based on total weight of polymeric material A and polymerizable materials B and reducing agent; the amount of such butadiene-based elastomeric polymeric material is in the range from 1 to 30 percent by weight, based on total weight of polymeric material A and polymerizable materials B and reducing agent; the amount of such polymer-in-monomer syrup is in the range from 2 to 60 percent by weight, based on total weight of polymeric material A and polymerizable materials B and reducing agent; the amount of said polyvinyl alkyl ether, styrene-acrylonitrile resin and unsaturated polyester resin is in the range from 5 to 75 percent by weight, based on total weight of polymeric material A and polymerizable materials B and reducing agent; the amount of said homopolymer or copolymer of at least one of styrene and esters of acrylic or substituted acrylic acids is in the range from 2 to 60 percent by weight, based on total weight of polymeric material A and polymerizable materials B and reducing agent; the amount of such styrene and acrylic or substituted acrylic monomers is in the range from 10 to 90 percent by weight, based on total weight of polymeric material A and polymerizable materials B and reducing agent; the amount of said phosphorus-containing compound is in the range from 0.1 to 20 percent by weight, based on total weight of polymeric material A and polymerizable materials B and reducing agent; the epoxy resin is present in an amount of 1 to 5 epoxide equivalents per equivalent of P—OH; said reducing agent is present in an amount of 0.05 to 10 percent by weight, based on total weight of polymeric material A and polymerizable materials B; and the amount of said oxidizing agent is in the range from 0.5 to 30 percent by weight, based on total weight of bonding accelerator.

14. An adhesive composition according to claim 13 wherein said phosphorus-containing compound has the formula

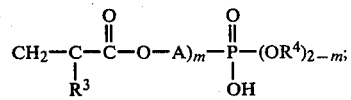

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having from 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms, $R^6$ is an alkylene group having from 1 to 7 carbon atoms, n is an integer from 2 to 10, and m is 1 or 2.

15. An adhesive composition according to claim 13 wherein said polymeric material I.A is selected from the group consisting of (1) at least one butadiene-based elastomeric polymeric material selected from the group consisting of
  (a) homopolymer of butadiene;
  (b) copolymer of butadiene and at least one monomer copolymerizable therewith selected from the group consisting of styrene, acrylonitrile, methacrylonitrile and mixtures thereof;
  (c) modified elastomeric material selected from the group consisting of butadiene homopolymer and copolymer as previously described, such homopolymer and copolymer having been modified by copolymerization therein of trace amounts up to 5 percent by weight, based on weight of modified elastomeric material, of at least one functional monomer; and
  (d) mixtures thereof; and
(2) an admixture of
  (i) at least one olefinically unsaturated urethane reaction product of at least one isocyanate-functional prepolymer and at least one hydroxy-functional monomer having at least one unit of polmerizable olefinic unsaturation, such reaction product being characterized by the presence of at least two units of olefinic unsaturation and the substantial absence of free isocyanate groups; and
  (ii) at least one butadiene-based elastomeric polymeric material selected from the group consisting of
    (a) homopolymer of butadiene;
    (b) copolymer of butadiene and at least one monomer copolymerizable therewith selected from the group consisting of styrene, acrylonitrile, methacrylonitrile and mixtures thereof;
    (c) modified elastomeric material selected from the group consisting of butadiene homopolymer and copolymer as previously described, such homopolymer and copolymer having been modified by copolymerization therein of trace amounts up to 5 percent by weight, based on weight of modified elastomeric material, of at least one functional monomer; and
    (d) mixtures thereof.

16. An adhesive system according to claim 16 wherein said phosphorus-containing compound has the formula

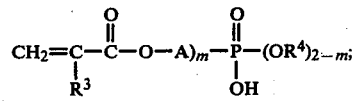

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having from 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms, $R^6$ is an alkylene group having from 1 to 7 carbon atoms, n is an integer from 2 to 10, and m is 1 or 2.

* * * * *